Patented May 30, 1933

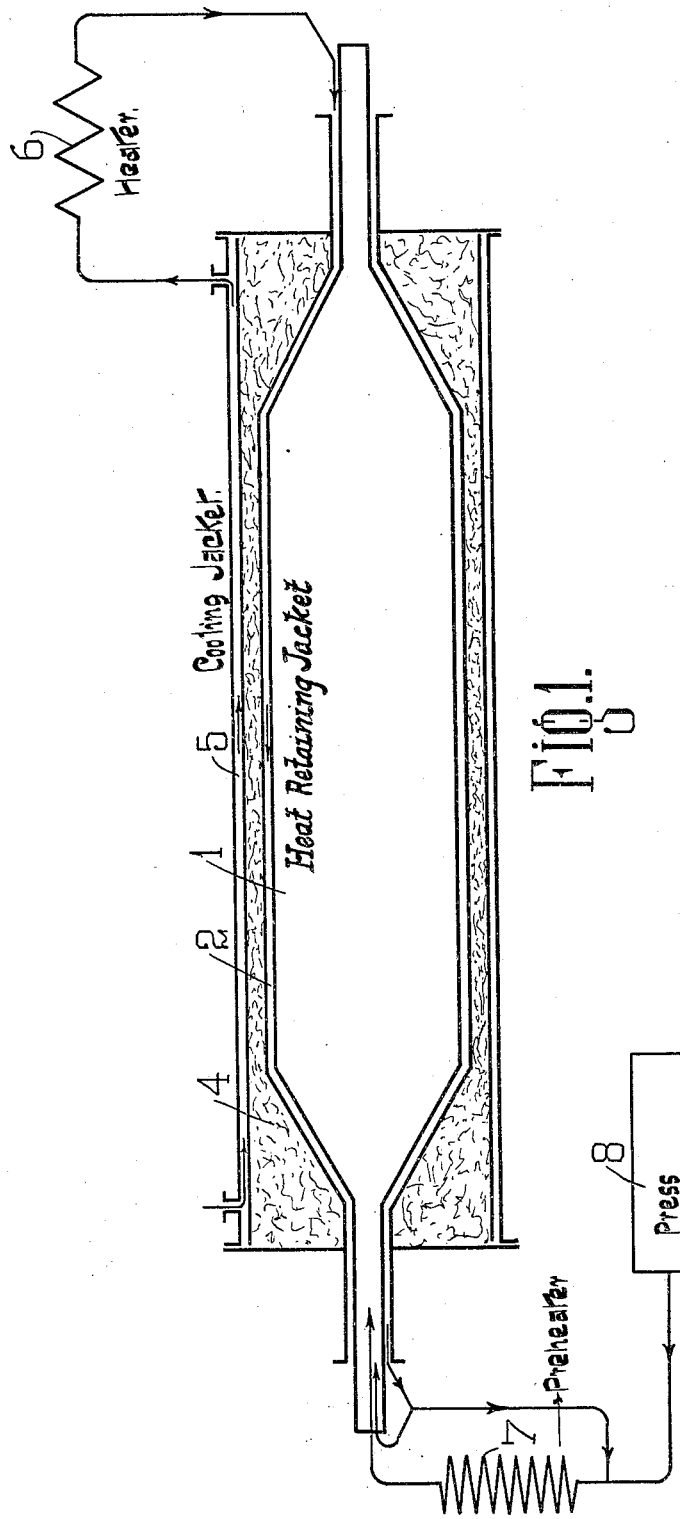

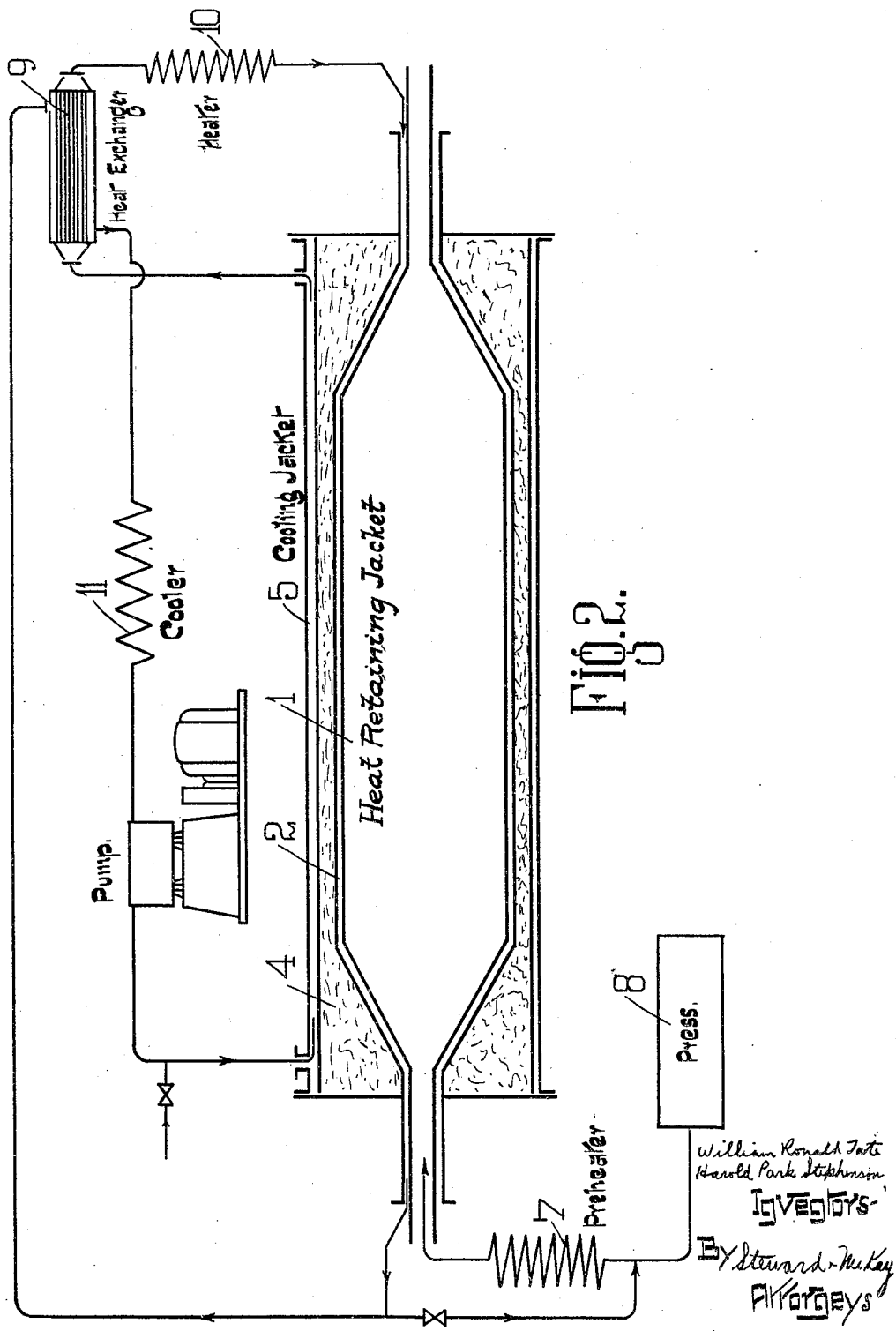

1,911,933

UNITED STATES PATENT OFFICE

WILLIAM RONALD TATE AND HAROLD PARK STEPHENSON, OF NORTON-ON-TEES, ENGLAND, ASSIGNORS TO IMPERIAL CHEMICAL INDUSTRIES LIMITED, OF LONDON, ENGLAND, A BRITISH COMPANY

APPARATUS FOR HYDROGENATING COAL, OILS, AND SIMILAR MATERIALS

Application filed December 5, 1929, Serial No. 411,967, and in Great Britain December 8, 1928.

This invention relates to an improved method and apparatus for the destructive hydrogenation of coal, oils and similar materials. The invention consists in the combination of peripheral heating of the reaction space by hot gas, which preferably participates in the reaction, and peripheral cooling of the external pressure resisting wall by cool gas which preferably participates in the reaction. The invention further consists in the employment of peripheral heat retaining streams of reacting gas which are circulated in an amount which is a multiple of that participating in the reaction. The invention further consists in the methods of circulating and by-passing the reacting gas as hereafter described.

We do not claim broadly the employment of peripheral heating or peripheral cooling.

As a result of these methods it is possible to provide a system whereby the necessary heat is supplied to the reaction material without requiring external heating of the walls of the high pressure vessel in which the reaction chamber is contained, to prevent the flow of heat from the reaction chamber to the external pressure-resisting walls, and to maintain the pressure-resisting walls at a relatively low temperature, not exceeding 100–200° C. for example.

The invention is illustrated in the accompanying drawings.

In one form of the invention, which is illustrated in Figure 1, a reaction space 1, is provided with a jacket 2, for the passage of hot gases which are supplied at a temperature not substantially lower than that existing within the reaction space so that heat may be retained in the latter. The reaction vessel and jacket are mounted in a high pressure vessel 3, suitable lagging 4 being provided in the intervening space. The high-pressure vessel in turn is provided with an internal jacket 5 for the passage of cold gases. The walls of the reaction vessel, and of the two jackets are made thin to permit of the ready passage of heat.

The method of working is as follows. Cold hydrogen is passed through the jacket 5 and thence to an external heater 6 where its temperature is raised to a suitable degree, e. g. 450° C. The gas is then passed through the jacket 2 and on issuing at the other end is divided into two streams, one leading directly to the reaction vessel and the other to a preheater 7 where it is mixed with coal, oil, etc. which is undergoing preheating to the reaction temperature, say 420° C. The coal or oil, etc. is supplied by a press 8.

The reaction is slightly exothermic in the majority of cases, a fact which should be borne in mind when regulating the temperature of the heater which should be such that the hydrogen will take up the excess heat.

A second form of the invention is illustrated in Figure 2. The arrangement of the converter is as before, but the path of the gases in the external circuits is different. In this case the hydrogen issuing from the jacket surrounding the reaction space is divided into two streams, one joining the preheated coal or oil as before while the other is sent to a heat exchanger 9 where it gives up its heat to the gas issuing from the cold jacket 5, which gas then is further heated in a heater 10 and passed through the jacket 2. The cold gas issuing from the heat exchanger 9 is further cooled at 11, and is pumped round the jacket 5 once more, a suitable amount of make-up hydrogen being added to compensate for the part of the hydrogen which is branched off for participation in the reaction. This arrangement permits of the circulation of a large quantity of hydrogen through the cold and hot jackets while only a fraction of the gas is passed to the reaction chamber.

The apparatus as shown in Figure 2 may obviously be modified so that an inert gas, which takes no part in the reaction may be employed as the heating and cooling agent. All that it is necessary to do is to disconnect the branch line running to preheater 7.

The apparatus may be constructed of mild steel or of a special nickel chromium steel. The lagging 4 consists of tightly packed asbestos or asbestos and cement. In the appended claims by "destructive hydrogenation" is to be understood the reaction between carbonaceous liquids and hydrogen under pressure, whereby low boiling products are formed directly without an intermediate cracking step. This reaction takes place at 400–500° C. under a pressure of about 50–250 atmospheres. By "carbonaceous liquids" we mean oils, tars, and suspensions of coal in these, with or without a catalyst.

We declare that what we claim is:

1. An apparatus for the destructive hydrogenation of carbonaceous liquids under high pressure comprising a pressure resisting vessel, a thin-walled metal shell inside said vessel and spaced therefrom to form an outer jacket, heat insulation in contact with the inner wall of said shell, an internal reaction vessel, a second thin-walled metallic shell surrounding said reaction vessel, spaced therefrom to form a second, inner jacket, means for feeding liquid under pressure to said reaction vessel, a heater for said liquid and means to supply gas under pressure to said jackets.

2. An apparatus for the destructive hydrogenation of carbonaceous liquids under high pressure comprising a pressure resisting vessel, a thin-walled metal shell inside said vessel and spaced therefrom to form an outer jacket, heat insulation in contact with the inner wall of said shell, an internal reaction vessel, a second thin-walled metallic shell surrounding said reaction vessel, spaced therefrom to form a second, inner jacket, means to circulate gas under pressure in said jackets, a heater, a connection between said outer jacket and said heater, a connection between said heater and said reaction vessel, means for feeding liquid under pressure to said reaction vessel, and a heater for said liquid.

3. An apparatus for the destructive hydrogenation of carbonaceous liquids under high pressure comprising a pressure resisting vessel, a thin-walled metal shell inside said vessel and spaced therefrom to form an outer jacket, heat insulation in contact with the inner wall of said shell, an internal reaction vessel, a second thin-walled metallic shell surrounding said reaction vessel, spaced therefrom to form a second, inner jacket, means to circulate gas under pressure in said jackets, a heater, a connection between said outer jacket and said heater, a connection between said heater and one end of said inner jacket, means to supply reaction liquid under pressure to said reaction vessel, a heater for said liquid and a connection between the other end of said inner jacket and said heater.

4. In an apparatus as set forth in claim 3 the provision of a by-pass connecting the end of said inner jacket with said reaction vessel.

5. An apparatus for the destructive hydrogenation of carbonaceous liquids under high pressure comprising a pressure resisting vessel, a thin-walled metal shell inside said vessel and spaced therefrom to form an outer jacket, heat insulation in contact with the inner wall of said shell, an internal reaction vessel, a second thin-walled metallic shell surrounding said reaction vessel, spaced therefrom to form a second, inner jacket, means for feeding liquid under pressure to said reaction vessel, a heater for said liquid, means to circulate gas under pressure in said jackets, a heat exchanger, and connections thereto from said jackets.

In witness whereof we have hereunto signed our names this 22nd day of November, 1929.

WILLIAM RONALD TATE.
HAROLD PARK STEPHENSON.